(12) United States Patent
Pakhunov (10) Patent No.: US 8,024,791 B2
(45) Date of Patent: Sep. 20, 2011

(54) PROVIDING HINTS WHILE ENTERING PROTECTED INFORMATION

(75) Inventor: Alexey Pakhunov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 12/131,036

(22) Filed: May 30, 2008

(65) Prior Publication Data

US 2009/0300755 A1     Dec. 3, 2009

(51) Int. Cl.
*G06F 7/04* (2006.01)
(52) U.S. Cl. .......................................................... 726/18
(58) Field of Classification Search ...................... 726/18
See application file for complete search history.

(56) References Cited

U.S. PATENT DOCUMENTS

| | | | |
|---|---|---|---|
| 5,425,102 A | 6/1995 | Moy | |
| 7,028,192 B2 | 4/2006 | Butler | |
| 7,240,339 B2 | 7/2007 | Cragun et al. | |
| 7,681,234 B2 * | 3/2010 | Florencio et al. | 726/22 |
| 2005/0071637 A1 * | 3/2005 | Shirakawa | 713/170 |
| 2005/0071645 A1 * | 3/2005 | Girouard et al. | 713/183 |
| 2005/0071686 A1 | 3/2005 | Bagga et al. | |
| 2005/0289645 A1 | 12/2005 | Hori | |
| 2006/0047969 A1 | 3/2006 | Goertzen | |
| 2006/0048215 A1 | 3/2006 | Brown et al. | |
| 2007/0006279 A1 | 1/2007 | Brown et al. | |
| 2007/0157028 A1 | 7/2007 | Lott | |

FOREIGN PATENT DOCUMENTS

US    WO0113572 A1    2/2001

OTHER PUBLICATIONS

Fontana, "Forget Sticky Notes, Microsoft using Inkblots as Password Reminders", Dec. 4, 2007,Network World, Inc., pp. 1-4.
Langridge, "Capturing Caps Lock", retrieved at <<http://24ways.org/2007/capturing-caps-lock>>, pp. 6.
"Balloons", 2008, Microsoft Corporation, pp. 6.

* cited by examiner

*Primary Examiner* — Kambiz Zand
*Assistant Examiner* — Teshome Hailu (57) ABSTRACT

One or more hints can be presented during the entry of protected information. Traditionally, for security reasons, the protected information is displayed as ambiguous characters, hindering the ability to determine if there was an error inputting the information. A hash can be calculated from some or all of the protected information already input, and the resulting hash value can be used to select a hint. The hints can be selected from a relatively small number of easily distinguishable hints, including visual, auditory and sensory hints, or any combination thereof. The hints are not a globally unique identifier of the protected information and can, instead, be used to detect a deviation from the correct entry of the protected information.

20 Claims, 4 Drawing Sheets

PROVIDING HINTS WHILE ENTERING PROTECTED INFORMATION

BACKGROUND

Users of computing devices are increasingly requested for information that should be protected from malicious elements. For example, computing devices often require passwords to enable users to access even basic functionality. Additional passwords can then be required to access specific functions, software applications, data, or other resources through the computing device. Other information, such as social security numbers, credit card numbers, personal identification numbers, and other like information that is also to be protected is often requested by, and utilized by, computing devices.

One mechanism for protecting information from malicious elements, especially during its entry, such as by a user through a keyboard or other user entry device, is to display, not the data that the user is entering, but other non-descript elements, such as asterisks, dots, and the like. While such display tactics can prevent protected information from being captured, such as through visual surveillance means, they can also remove an important avenue of feedback for the user entering the information. In particular, because the same non-descript elements are displayed irrespective of the data entered by the user, the user cannot verify that they are entering the correct data.

One common mistake made by users when entering data is to accidentally activate the "caps lock" key, which causes the entry of different data than the user expected. However, mechanisms now exist whereby the activation of the caps lock key can be detected and the user can be informed of its activation, such as through a symbol representing the activation of the caps lock key, or through an explicit textual notification. Additional mechanisms have been developed that link a user's password to a globally unique indicator that cannot be generated other than by the exact password, but from which the user's password itself cannot be derived. Such a globally unique indicator can inform the user that they typed the password in correctly because that globally unique indicator only appears after the user has typed in their complete password, and only their password, correctly.

SUMMARY

Based on traditional operations, a user's expectations, when presented with a request for protected information, are that the user will enter the protected information with a minimum of additional effort or activity. Therefore, in one embodiment, hints can be provided to a user while protected information is being entered, such that the hints need not materially change the quantity or complexity of the actions taken by the user. In particular, the presentation of hints can be provided with each character, or other quantum of entry, is entered and such hints need not be interactive or otherwise distract the user.

In another embodiment, the hints provided during the entry of protected information can be selected from a small number of easily distinguishable hints that are not globally unique since a number of possible entries by the user can result in the same hint being presented to the user. The hints provided, rather than being a globally unique identifier of the correctly entered protected information are instead designed to alert the user to more common entry errors. Specifically, common entry errors, including, for example, unexpected settings and mis-entries, are likely to result in the presentation of hints other than those normally presented, thereby alerting the user to the entry errors.

In a further embodiment, the hint presented in response to the entry of protected information can be selected based on a hash value of the entered protected information. Such a hash value can be divided by a value associated with the quantity of distinguishable hints available, and the remainder can act as a selector of the particular distinguishable hint that will be presented. The hash can be based on some or all of the protected information entered at the time that the hint is generated.

In a still further embodiment, the hints presented can be selected from a small set of easily distinguishable hints. For example, the set of easily distinguishable hints can be a series of simple images, easily distinguishable colors, easily distinguishable sounds, smells, physical manifestations, or other like hints that can be perceived by a user. The specific hints used are immaterial, so long as they can provide a mechanism by which a user can distinguish between them.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of distinguishable hints during the entry of protected information to provide a mechanism by which common entry errors can be detected. While protected information is being entered a hash can be computed based on some or all of the protected information entered at that point. The hash value can be used to select from among a small number of easily distinguishable hints, and the selected hint can be provided. While the same hint may be provided in multiple instances, common entry errors, such as unexpected settings or mistyped characters, can likely result in the presentation of different, distinguishable hints, thereby providing an indication that the protected entry is not being entered in an expected manner.

The techniques described herein focus on, but are not limited to, the presentation of visual hints to a user entering protected information into a computing device. Indeed, the techniques below are equally applicable to the presentation of hints relying, in whole or in part, on auditory, physical, or other sensory mechanisms. Similarly, the techniques described below can be implemented in distributed computing environments with only straightforward modification.

Consequently, while the descriptions below will reference figures illustrating visual hints on a computing device display, the descriptions are not so limited and are intended to encompass the presentation of other types of hints and other types of platforms.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
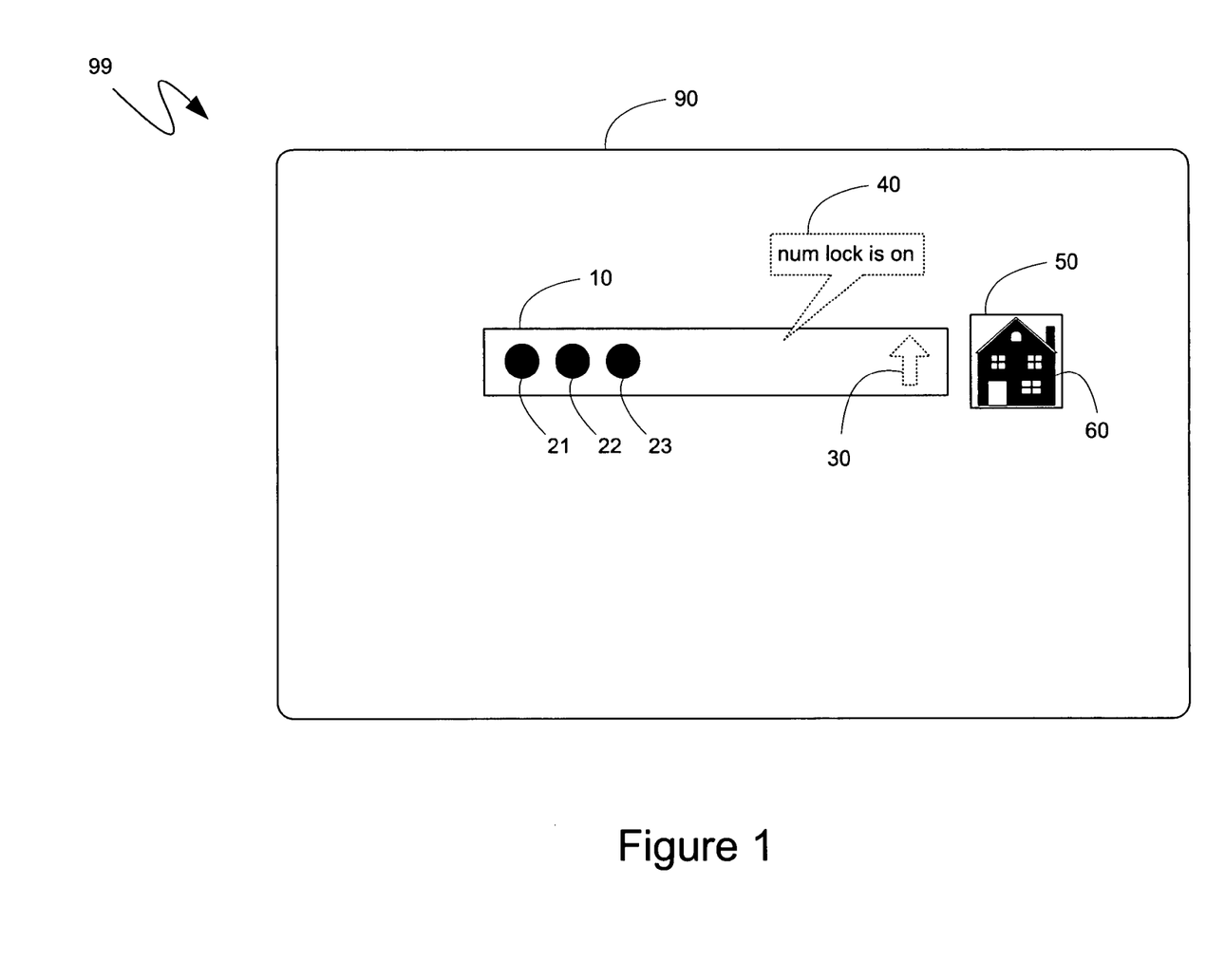
FIG. 1 is a diagram of an exemplary protected entry area and associated hint area.

With reference to FIG. 1, an exemplary display environment 99 is illustrated, comprising a display area 90 which, in turn, comprises an entry box 10 for entering protected information. To provide context, the display area 90 can be some or all of the display attached to a computing device, such as the region of the display devoted to a particular software application program, or the whole display itself. Similarly, the entry box 10 can be password entry box, such as, for example, can be provided by an operating system prior to logging a user onto the computing device, or which can be, as another example, presented to the user through a web browser to enable the user to access a restricted web site. However, because neither the precise context of the display area 90 nor the entry box 10 are required for the mechanisms described herein, further context for them is not illustrated in FIG. 1.

Traditionally, the entry box 10, and associated mechanisms, are designed that the input into the entry box is protected from visual inspection by displaying generic characters instead of the actual information entered. For example, as illustrated in FIG. 1, the entry box 10 can comprise an entry that has been displayed as three black circles 21, 22 and 23. While the black circles 21, 22 and 23 can each represent one character, or other quantum, of the entered information, they can also be associated with more than one character to provide greater security.

Because a user entering information into the entry box 10 cannot visually inspect the information entered, since the provided visual feedback is not indicative of the actual information entered, the user cannot tell if they are entering the information properly. Consequently, various operating systems and applications may provide specific indicators for specific unexpected conditions that often cause users to enter information improperly into the entry box 10. FIG. 1 illustrates two such indicators; in particular a caps lock indicator 30 and a more generic textual indicator 40. The textual indicator 40 can convey information to the user regarding the caps lock status, num lock status, as indicated in FIG. 1, or any other information, such as the setting of the keyboard into a foreign language setting, that may cause the user to enter information improperly into the entry box 10.

In one embodiment, a hint 60 can be provided in a hint area 50 while protected information is being entered into the entry box 10. The hint area 50, and the hint 60, can be provided instead of, or in addition to, the caps lock indicator 30 and the textual indicator 40, since the hint area, and the associated hint, provide information that is orthogonal to the information provided by the caps lock indicator and textual indicator. The hint area 50 is illustrated in FIG. 1 as being located to the side of the entry box 10. However, in other embodiments, the hint area can be superimposed over the entry box, it can be located in any one of multiple locations proximate to the entry box depending on, for example, the location of other display elements, such as the cursor, or it can be located in a standard location remote from the entry box, such as in a task bar or other specifically reserved area of display area 90. In yet another embodiment, the hint area 50 need not be confined to the display 90 and can, instead, be presented to the user through another display or other presentation means. For example, the hint area 50 can be in a small display integrated into a keyboard or other data entry peripheral.

As will be described further below, in one embodiment, the hint 60 presented to the user in the hint area 50 can be selected based on some or all of the information already entered into the entry box 10. A hash can be computed from some or all of the information already entered into the entry box 10. The resulting hash can then be used to select from among multiple predetermined hints, selected such that they are easily distinguishable by the user. When the user enters additional information into the entry box 10, the computed hash value can change and, consequently, the hint 60 can change. If the user does not perceive the hint 60 that the user was expecting, the user can know that the information they are actually entering into the entry box 10 differs from the information the user believes they are entering. While such a difference can be due to entry errors on the part of the user, it can also be due to the existence of unexpected settings, such as the activation of the caps lock, the num lock, or other information entry settings, such as the setting of the keyboard into a foreign language layout.

The hint 60 can, in one embodiment, be selected from a relatively small number of easily distinguishable hints. As indicated previously, the hints presented need not be limited to the iconic hints illustrated and described below. Contemplated types of hints can be other forms of graphical hints, such as more complex images, simple color swatches, or color or pixel patterns. Contemplated types of hints can also be auditory hints, physical hints, or any combination of the previously described hints.

Because the hint 60 can, in one embodiment, seek to detect common input errors, as opposed to uniquely and globally identifying the information entered into the entry box 10, there may not be a need for a lot of possible hints from which to select the hint 60. In one embodiment, the number of hints from which the hint 60 can be selected can be as small as thirty, twenty, ten, or even fewer than ten different hints. Even with only ten different hints, for example, the chance that a user's mis-entry of information into the entry box 10 will result in the presentation of the same hint as if the user had correctly entered information is only ten percent.

In one embodiment, the selection of the hint 60 from among the collection of possible hints can be based on a hash value obtained from some or all of the information currently entered into the entry box 10. The information currently entered into the entry box 10 can be hashed using any of a number of hashing algorithms, though, in one embodiment, for security reasons, the hash algorithm utilized can differ from the hash algorithm used by whatever protected information verification system verifies the protected information that is entered into the entry box. As will be known by those skilled in the art, common hash values can be sixteen, thirty-two bits or even larger, resulting in potentially millions of unique values. One mechanism that can be utilized to use such a wide range of hash values to select from among a significantly smaller number of possible hints can be to divide the hash value by the number of possible hints. The resulting remainder can then be directly mapped to each of a possible number of hints. Alternative mechanisms are equally applicable, such as mapping a range of hash values to a hint from among the possible hints.

Because the information entered into the entry box 10 is likely to be a relatively small number of characters, or other quanta of input information, in one embodiment, the hash value used to select the hint 60 can be computed from a hash of all of the input then present in the entry box 10. However, in an alternative embodiment, the hash value can be based on a sub-set of all of the information entered, such as, for example, only the five most recently entered characters. The selection of the input information to the hash function from the entry box 10 can be strictly a design choice, as it is likely that even relatively large entries can be hashed within an insignificant amount of time on a modern computing device.

Figure 2:
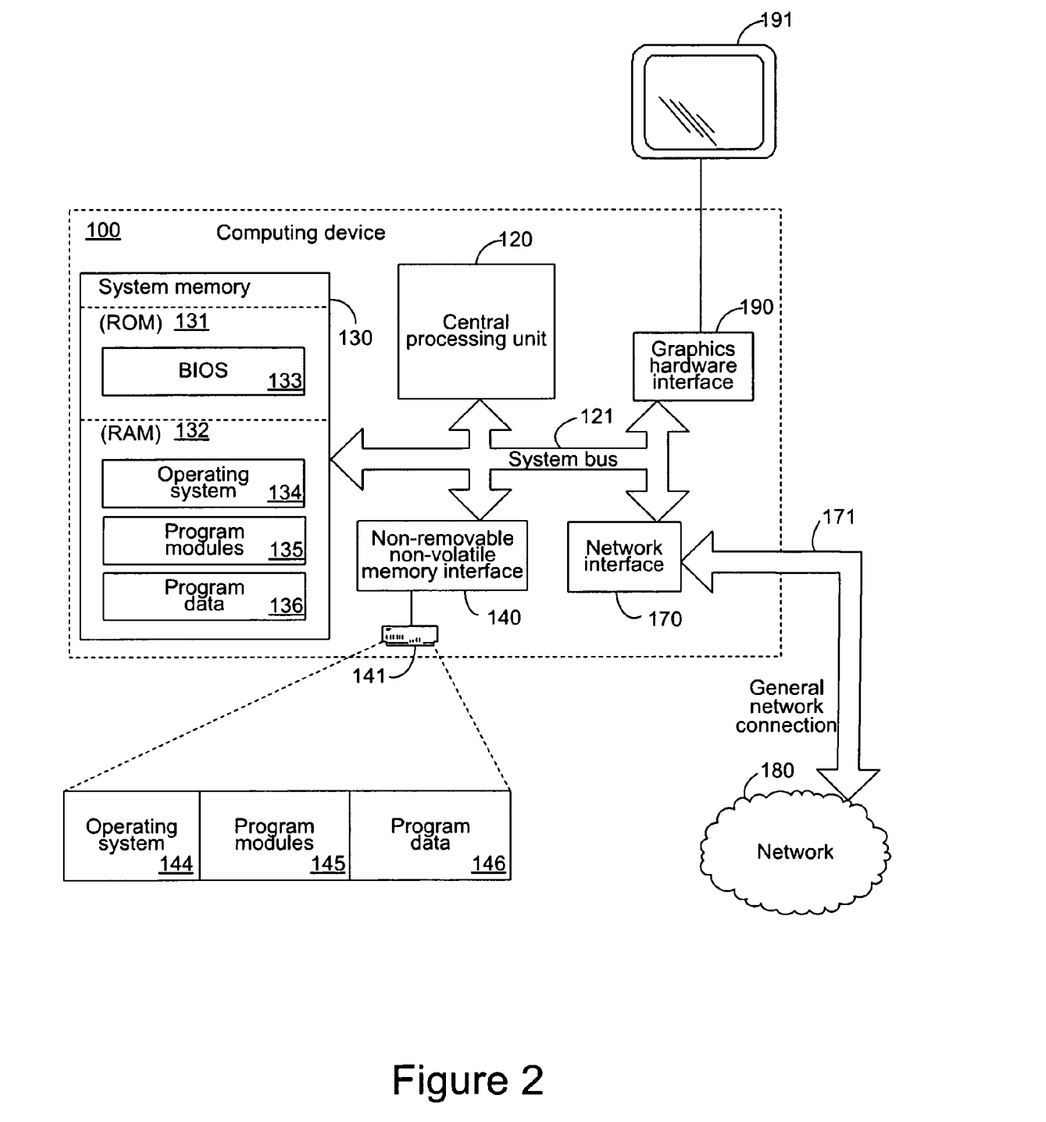
FIG. 2 is a block diagram of an exemplary computing device.

An exemplary computing device that can execute some or all of the described mechanisms is illustrated with reference to FIG. 2. In particular, FIG. 2 illustrates an exemplary computing device 100 which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For example, the computing device 100 is shown in FIG. 2 to be connected to a network 180 via a general network connection 171 that can be a local area network (LAN), a wide area network (WAN) or other network connection. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The operating system 134 and other software applications, represented by the program modules 135, can present one or more protected information entry boxes, such as the protected information entry box 10, to a user of the computing device 100, via the display 191. In one embodiment, a user can be provided with the option of how such protected information entry boxes are to behave and such functionality can be leveraged to invoke and provide the functionality described herein. In another embodiment, individual components of the operating system 134, either exclusively, or together with the program modules 135, can be modified to invoke and provide the functionality described herein.

Figure 3:
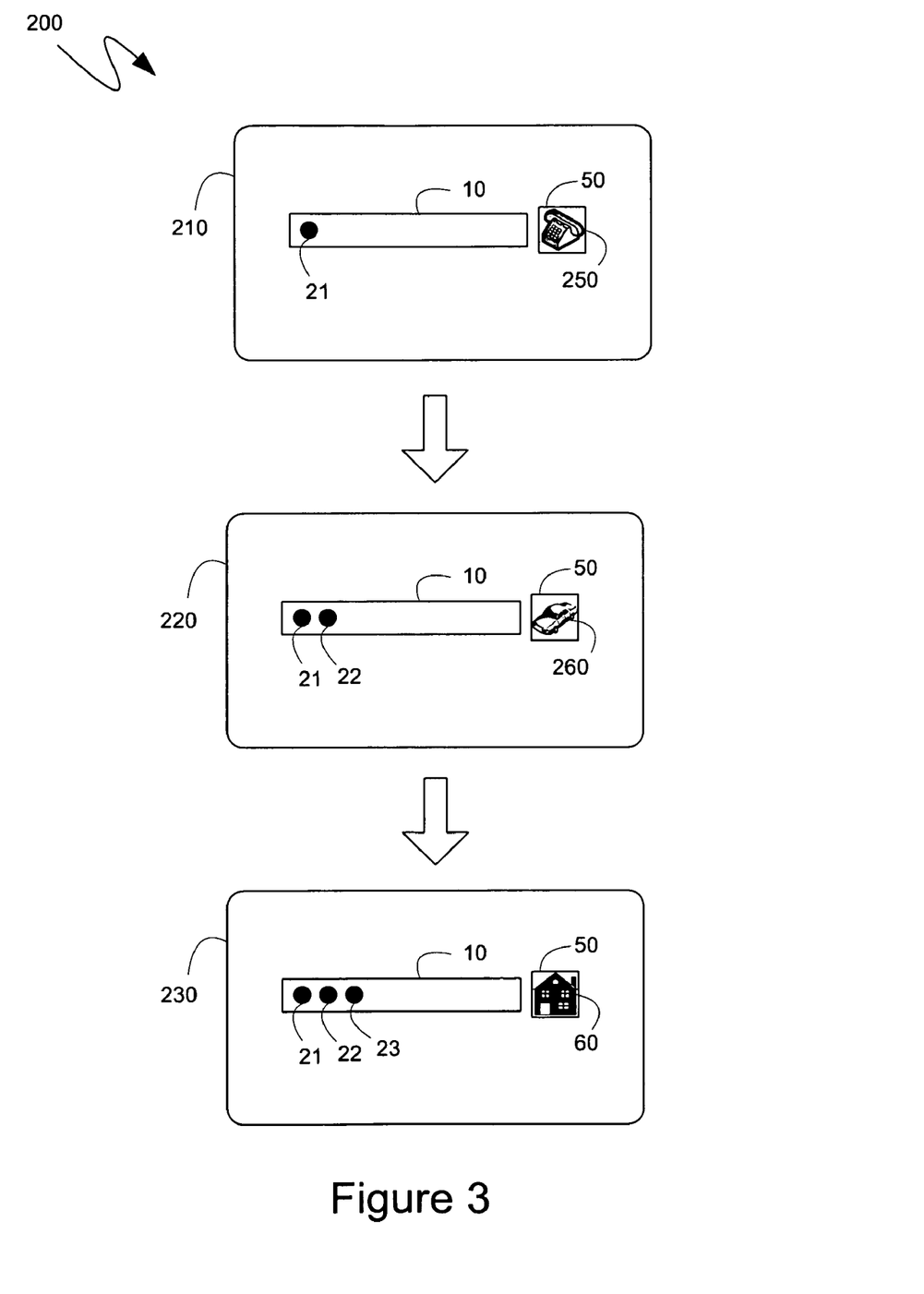
FIG. 3 is a diagram of a series of exemplary protected entry areas and associated hint areas.

Further illustration of the provision of visual hints to alert the user to potential errors during the entry of protected information is made with reference to the progression diagram 200 illustrated in FIG. 3. Turning to FIG. 3, the progression diagram 200 illustrates three display areas 210, 220 and 230, illustrating a response to the entry of information into the entry box 10. Initially, the display area 210 is shown comprising the entry box 10 after one character, or other quantum of information, represented by the single ambiguous black circle 21, had been entered into the entry box. A hash of the information represented by the black circle 21 can yield a hash value that can be used, such as in the manner described above, to select a hint. In the illustrated example of FIG. 3, the visual hint 250 can be selected from the hash of the information represented by the black circle 21.

In an alternative embodiment, a hint can have been presented even before any information had been entered into the entry box 10. In particular, a hash can be calculated from a zero length string, such as would be obtained from the entry box 10 prior to the entry of any information into it. Such a hash value can, like any of the other hash values described, reference a particular hint that can be displayed with the presentation of the entry box 10, prior to the entry of any information in the entry box 10. Such a presented hint can then change with the entry of the information represented by the black circle 21 shown in display area 210 in the same manner as described below with reference to the change in the presented hints between display area 210 and display area 220.

In particular, as illustrated by the subsequent display area 220, additional information from that shown in display area 210, represented by the black circle 22, can be entered into the entry box 10. Upon entry of the information represented by the black circle 22, another hash of some or all of the information in the entry box 10 can be computed and the resulting value can be used to select another hint. In the illustrated example of FIG. 3, the visual hint 260, shown as a car, can be provided in the hint area 60, replacing the visual hint 250, shown as a telephone.

Display area 230 can represent the resulting display after the addition of additional information, represented by the black circle 23, into the entry box 10. Again, as above, another hash can be computed from some or all of the information in the entry box 10 and the resulting hash value can be used to select a hint. In the illustrated example, the hint 60 can be presented in the hint area 60, illustrated as a house. If the protected information represented by the black circles 21, 22 and 23 is information that is often entered by the user, such as a password or other informational key, the user will likely begin to recognize the easily distinguishable hints provided in the hint area 50. Consequently, if the user accidentally began entering information with the, for example, num lock activated, and the entry of the protected information was traditionally performed without the num lock activated, the user would see a different series of easily distinguishable hints, such as a tree, a bird, or other easily distinguishable iconic image in the illustrated example of FIG. 3. The presence of such different hints can serve as an alert to the user that something is amiss with respect to the entry of the protected information.

A similar user notification function can be provided if the user mistyped a character, or mis-entered some other quantum of information. For example, returning to the illustrated example of FIG. 3, if the black circle 23 represented a mistyped character, the displayed hint, rather than displaying the house 60, could display another iconic image, such as a bird. If the user was expecting a house, and instead saw a bird, the user could recognize that they mis-entered the protected information. Additionally, if the user recalled that the hints 250 and 260 were as expected, then the user could additionally realize that the only hint deviating from an expected image was the hint 60, enabling the user to determine that it was only the most recent entry, represented by the black circle 23, that the user had mis-typed.

Figure 4:
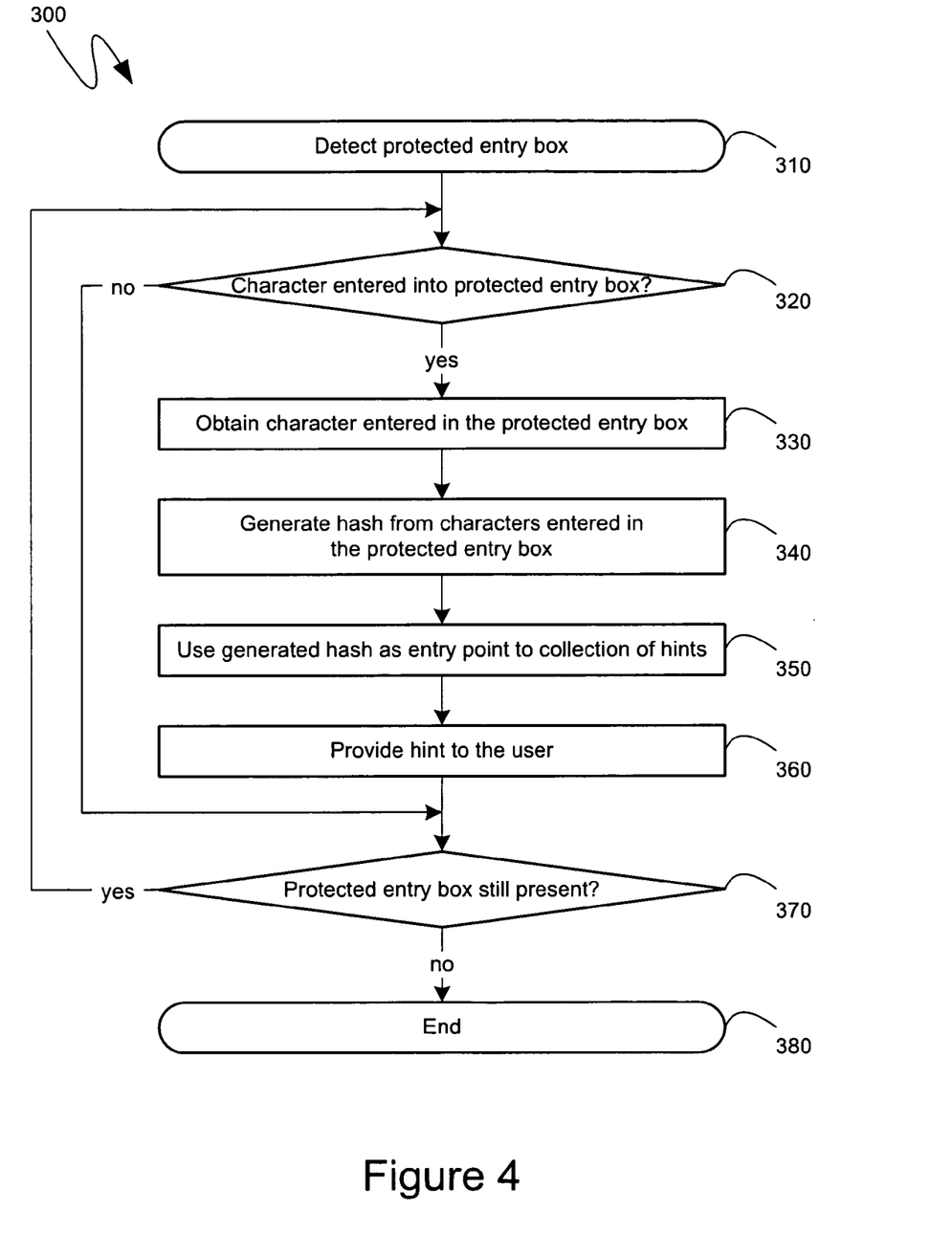
FIG. 4 is a flow diagram illustrating an exemplary hint generation mechanism for protected entry areas.

Turning to FIG. 4, a flow diagram 300 illustrates an exemplary series of steps that can be performed by one or more components implementing the above described mechanisms. Initially, as illustrated by FIG. 4, a protected information entry box, such as entry box 10, can be detected at step 310. Subsequently, at step 320, a determination can be made whether there was a character, or other quantum of information, entered into the protected information entry box. If there had been no entry in the entry box, processing can proceed to step 370, whereby another determination can be made whether the protected information entry box detected at step 310 was still being presented.

In an alternative embodiment, as indicated previously, though not specifically illustrated in FIG. 4, an entry box with no entry can still result in the selection of a hint that can be presented to the user. In such an embodiment, a hash of the zero length string obtained from the entry box with no information can be used to select and display a hint, in a manner analogous to that described below with reference to steps 340, 350 and 360 prior to the determination, at step 370, whether the protected information entry box was still being presented. In either embodiment, however, if the determination, at step 370, found that the entry box was still being presented, processing can return to step 320 and can, thereby, wait for input into the protected information entry box. If, however, it is determined at step 370 that the protected information entry box is no longer being presented, the processing can end at step 380.

Returning to the decision at step 320, if a character, or other quantum of information, is determined to have been entered into the protected information entry box, then processing can proceed to step 330 where the character, or other quantum of information, can be obtained from the entry box. In one embodiment, previously entered information can be retained in memory by the process or processes performing the steps of flow diagram 300 such that only the most recently entered information is obtained at step 330. In an alternative embodiment, no prior entered information can be retained, and step 330 can comprise the obtaining of some or all of the information entered into the protected information entry box.

Once obtained, the some or all of the information entered into the protected information entry box can be hashed at step 340 using any one of a number of known, or even custom-designed, hash algorithms. The resulting hash value can be used, at step 350, as an entry point into the collection of easily distinguishable hints. As indicated previously, the resulting hash value can be used by, in one embodiment, dividing it by a number equal to the number of available hints. Alternatively, as also indicated previously, the hash value obtained at step 340 can be used at step 350 by mapping a range of hash values to possible hints and selecting the hint based on its enclosing range and the hint associated therewith.

Once the hint has been selected, it can be presented to the user at step 360. In one embodiment, the presentation of the hint at step 360 can comprise the visual presentation of a hint, such as in the hint area 50. In another embodiment, the presentation of the hint can comprise the playing of an audible hint, the generating of a physical hint, or any combination thereof. After the hint selected at step 350 has been presented to the user at step 360, processing can proceed to the decision at step 370 to determine, as described above if the protected information entry box is still present. If it is, processing can return to step 320 to wait for additional input into the entry box. If the protected information entry box is found, at step 370, to no longer be present, processing can end at step 380.

As can be seen from the above descriptions, mechanisms for presenting hints to a user to aid the user in detecting errors in the entry of protected information have been enumerated. In view of the many possible variations of the subject matter described herein, we claim as our invention all such embodiments as may come within the scope of the following claims and equivalents thereto.

I claim:

1. One or more computer-readable storage media comprising computer-executable instructions for providing hints during the entry of protected information, the computer-executable instructions directed to steps comprising:
   detecting an entry of a quantum of protected information into a protected information entry box;
   obtaining, in response to the detecting, at least some of the protected information already entered into the protected information entry box, the at least some of the protected information comprising the quantum of protected information whose entry was detected;
   generating a hash value from the obtained information;
   selecting, based only on the generated hash value, a hint, from among a predetermined set of distinguishable hints, that is repeatably associated with the generated hash value such that the computer-executable instruction performing the selecting can select the same hint each time the computer-executable instruction performing the generating generates the same hash value;
   presenting the hint within a hint area; and
   repeating the detecting, the obtaining, the generating, the selecting and presenting for each detecting entry while the protected information is being entered into the protected information entry box.

2. The computer-readable storage media of claim 1 comprising further computer-executable instructions for detecting the protected information entry box and for removing the hint area if the protected information entry box is no longer detected.

3. The computer-readable storage media of claim 1, wherein the hint area is proximate to the protected information entry box.

4. The computer-readable storage media of claim 1, wherein the predetermined set of distinguishable hints comprises no more than ten distinguishable hints.

5. The computer-readable storage media of claim 1, wherein the quantum of protected information comprises an alphanumeric character.

6. The computer-readable storage media of claim 1, wherein the computer-executable instructions for selecting the hint comprise computer-executable instructions for dividing the generated hash value by a quantity of the predetermined set of distinguishable hints and utilizing a remainder of the dividing as an identifier of the hint.

7. The computer-readable storage media of claim 1, wherein the protected information comprises a password.

8. A computer-implemented method for providing hints during the entry of protected information, the method comprising the steps of:
   detecting, by processes executing on a computing device, an entry of a quantum of protected information into a protected information entry box displayed on a display device that is communicationally coupled to the computing device via a graphics hardware interface;
   obtaining, in response to the detecting, by the processes executing on the computing device, at least some of the protected information already entered into the protected information entry box, the at least some of the protected information comprising the quantum of protected information whose entry was detected;
   generating, by the processes executing on the computing device, a hash value from the obtained information;
   selecting, by the process executing on the computing device, and based only on the generated hash value, a hint from among a predetermined set of distinguishable hints, that is repeatably associated with the generated hash value such that the computer-implemented step of selecting can select the same hint each time the computer-implemented step of generating generates the same hash value;
   generating, by the processes executing on the computing device, a visual representation of the hint within a hint area displayed on the display device that is communicationally coupled to the computing device via the graphics hardware interface; and
   repeating, by the processes executing on the computing device, the detecting, the obtaining, the generating, the selecting and the presenting for each detecting entry while the protected information is being entered into the protected information entry box.

9. The method of claim 8 further comprising the steps of: detecting, by the processes executing on the computing device, the protected information entry box; and removing, by the processes executing on the computing device the hint area if the protected information entry box is no longer detected.

10. The method of claim 8, wherein the hint area is proximate to the protected information entry box.

11. The method of claim 8, wherein the predetermined set of distinguishable hints comprises no more than ten distinguishable hints.

12. The method of claim 8, wherein the quantum of protected information comprises an alphanumeric character.

13. The method of claim 8, wherein the step of selecting the hint comprises the steps of: dividing the generated hash value by a quantity of the predetermined set of distinguishable hints; and utilizing a remainder of the dividing as an identifier of the hint.

14. The method of claim 8, wherein the protected information comprises a password.

15. A user interface of a computing device for aiding a user to detect an error in entering protected information while the user is entering the protected information, the user interface comprising:
   a protected information entry box generated on a display device that is communicationally coupled to the computing via device a graphics hardware interface, the protected information entry box receiving the user-entered protected information and displaying the received user-entered protected information as at least one ambiguous display element that is unrelated to the user-entered protected information; and a hint area also generated on the display device that is communicationally coupled to the computing device via the graphics hardware interface, the hint area displaying a hint that is repeatably selected from among a predetermined set of distinguishable hints based only on a hash of at least some of the user-entered protected information such that a selecting component can select the same hint each time a generating component generates the same hash value, the displayed hint being reselected with each quantum of protected information entered by the user.

16. The user interface of claim 15, wherein the hint area is proximate to the protected information entry box.

17. The user interface of claim 15, wherein the predetermined set of distinguishable hints comprises no more than ten distinguishable hints.

18. The user interface of claim 15, wherein the quantum of protected information comprises an alphanumeric character.

19. The user interface of claim 15, wherein the displayed hint is selected by a remainder remaining after dividing a hash value, resulting from the hash, with a quantity of the predetermined set of distinguishable hints.

20. The user interface of claim 15, wherein the user-entered protected information is a password.

* * * * *

UNITED STATES PATENT AND TRADEMARK OFFICE
CERTIFICATE OF CORRECTION

PATENT NO.        : 8,024,791 B2
APPLICATION NO.   : 12/131036
DATED             : September 20, 2011
INVENTOR(S)       : Alexey Pakhunov It is certified that error appears in the above-identified patent and that said Letters Patent is hereby corrected as shown below:

In column 9, line 43, in Claim 1, after "selecting and" insert -- the --.

In column 10, line 18, in Claim 8, delete "process" and insert -- processes --, therefor.

In column 10, line 33, in Claim 8, delete "detecting" and insert -- detected --, therefor.

In column 10, line 62, in Claim 15, delete "via device a" and insert -- device via a --, therefor.

Signed and Sealed this
Fifteenth Day of November, 2011

David J. Kappos
*Director of the United States Patent and Trademark Office*